United States Patent [19]
Thompson

[11] Patent Number: 5,419,537
[45] Date of Patent: May 30, 1995

[54] POP-UP STOCK GUARD

[76] Inventor: Richard M. Thompson, 1219 4th Ave., Canyon, Tex. 79015

[21] Appl. No.: 210,686

[22] Filed: Mar. 18, 1994

[51] Int. Cl.⁶ .............................................. A01K 3/00
[52] U.S. Cl. ...................................... 256/17; 256/14; 49/58; 49/131
[58] Field of Search ................... 256/14, 15, 16, 17, 256/13, 1; 49/131, 132, 133, 134, 58; 404/6, 10, 7, 8, 9

[56] References Cited

U.S. PATENT DOCUMENTS

| | | |
|---|---|---|
| 117,600 | 8/1871 | Caton . |
| 322,399 | 7/1885 | Smith . |
| 1,259,581 | 3/1918 | Zorn ................................. 49/132 X |
| 1,479,736 | 1/1924 | Petty ................................. 49/131 X |
| 1,529,460 | 3/1925 | Bremer . |
| 1,620,348 | 3/1927 | Hernton . |
| 2,024,063 | 12/1935 | Roper ................................. 49/131 |
| 3,491,482 | 1/1970 | Wedekind ............................ 49/131 |
| 3,744,185 | 7/1973 | Patterson ............................ 49/131 |
| 4,609,184 | 9/1986 | Elkins, Sr. ........................... 256/14 |
| 4,708,515 | 11/1987 | Davies ................................. 49/13 X |
| 4,844,423 | 7/1989 | Combs ................................ 256/14 X |
| 5,131,631 | 7/1992 | Cobbe ................................. 256/14 X |

FOREIGN PATENT DOCUMENTS

| | | | |
|---|---|---|---|
| 233860 | 12/1959 | Austria .................................. 49/131 |
| 764528 | 12/1956 | United Kingdom .................. 49/131 |

*Primary Examiner*—Randolph A. Reese
*Assistant Examiner*—Harry C. Kim
*Attorney, Agent, or Firm*—Dougherty, Hessin, Beavers & Gilbert

[57] ABSTRACT

A portable cattle guard is provided which includes an assembled rectangularly shaped base member. Contained within the confines of the base member are a pair of inclined cattle ramps movably connected along their longitudinal axis to a smaller, spring biased center ramp. The base member includes a pair of hollow vertical posts having inwardly facing guide slots cut therein. Each hollow post contains a coil spring assembly fixed to support the center ramp in normally upward attitude and depressible to a flat ramp configuration to allow vehicle passage.

10 Claims, 3 Drawing Sheets

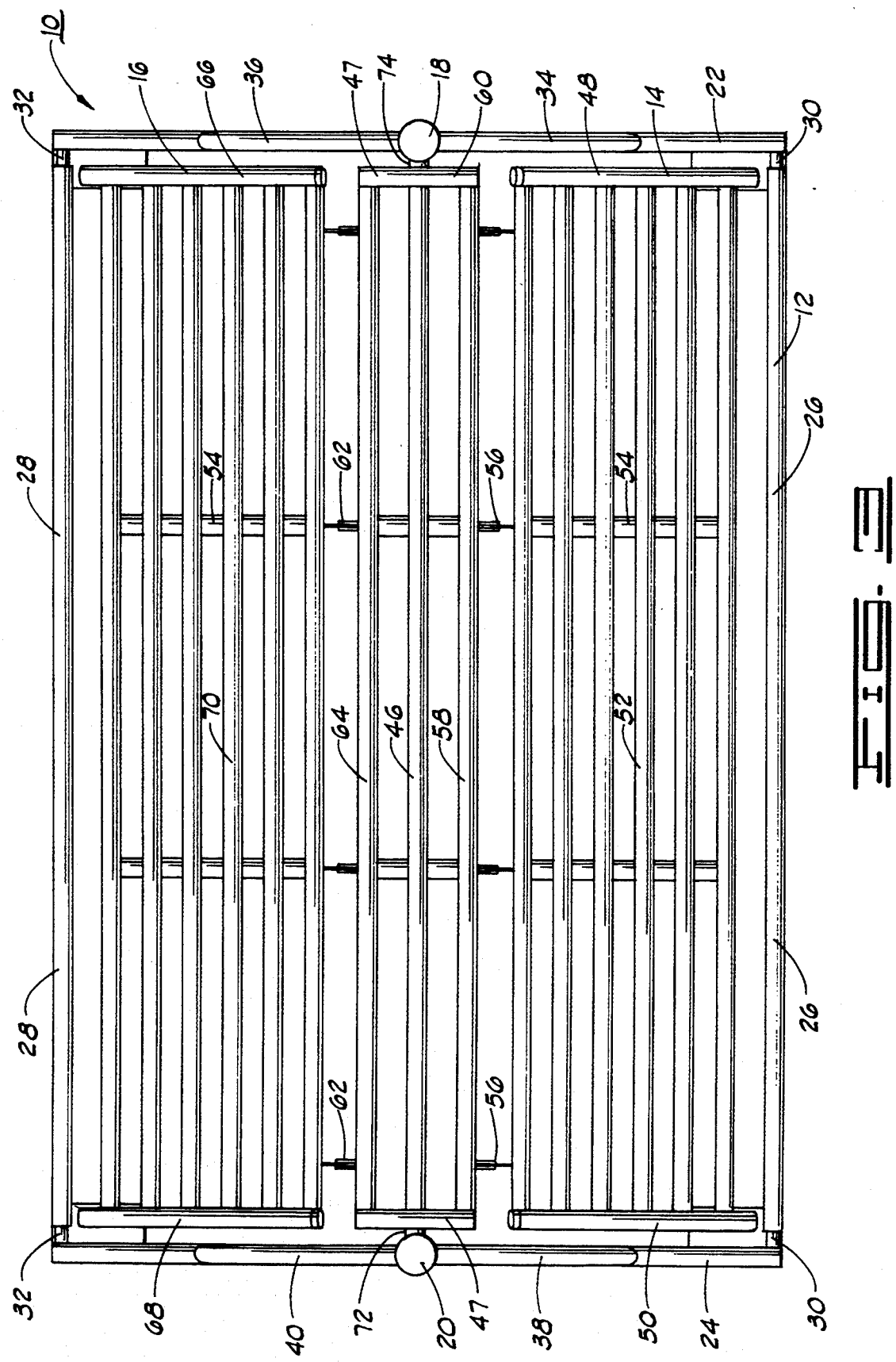

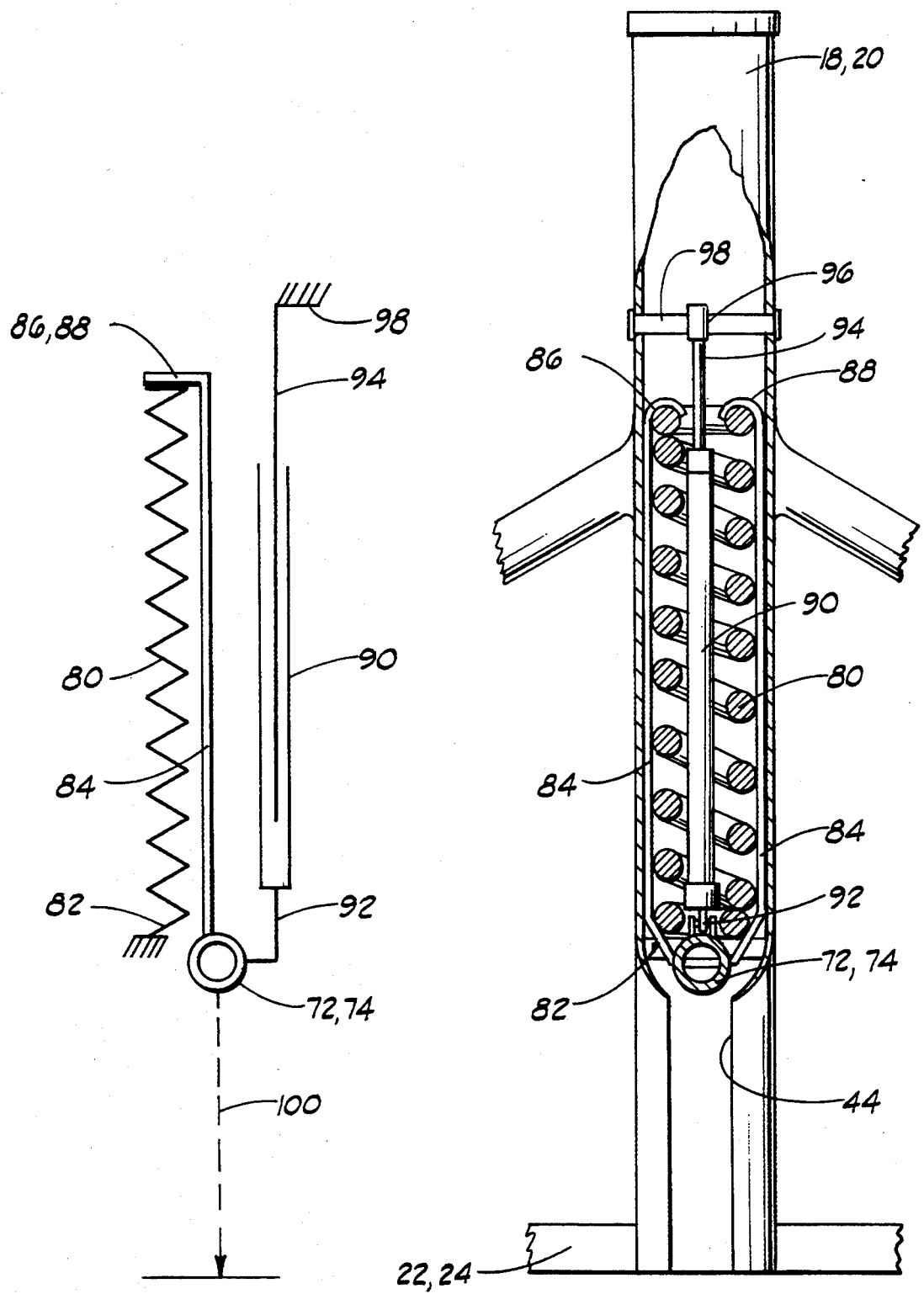

POP-UP STOCK GUARD

BACKGROUND OF THE INVENTION

1. Field of the Invention

The present invention relates to an improved type of portable cattle guard; specifically an improved structure of a type disclosed in U.S. Pat. No. 4,844,423 in the name of Combs as issued on Jul. 4, 1989.

2. Description of the Prior Act

Cattle are normally enclosed within the confines of a fixed fence line area. In most cases, there are several openings along the fence line to permit vehicles and farm equipment to pass into the enclosed area. When gates are used to close the openings, it is necessary for the driver of a vehicle to get out and open or close the gate upon entering or leaving the confined area. In order to avoid the above, cattle guards are provided in openings in a fence line to facilitate movement therethrough.

Cattle and other farm animals are reluctant to pass over parallel, spaced apart bars forming a cattle guard as it is normally placed over a ditch thereby to create an unstable footing area. If the cattle guards are substantially flush with the ground surface, cattle will, after a period of time, learn to cross over and not fear the cattle guards. Therefore, most cattle guards are placed over ground areas that are sunken or where a trench has been cut. This type of arrangement necessitates that the cattle guards be constructed from heavy gauge steel capable of supporting vehicles passing thereover.

Accordingly, a need exists for a type of cattle guard that is capable of providing a space between the ground surface while at the same time being constructed of a material that is light weight and can be easily assembled and placed into fence openings. In addition, the locations of fence openings may be changed from time-to-time and may require additional cattle guards.

Cattle guards have been in use for over a hundred years, along fence openings, across roads and to inhibit cattle from crossing onto railroad tracks and the like. Examples of various types of cattle guards including their general structural and operational features can be found in U.S. Pat. Nos. 117,600, 1,529,460, 1,620,348, 322,399 and 4,609,184.

SUMMARY OF THE INVENTION

The portable cattle guard, the present invention, incorporates a rectangularly shaped base member comprising two side members and two end members secured by conventional securing means. Each of the side members of the rectangular base member has a vertical, hollow tubular post member centrally fixed thereto and each of the tubular posts has a lower guide slot cut in the inward side. Within the tubular member is a spring assembly seated within the hollow tubular post member. The device includes opposite side ramp members and a center ramp member which are each constructed as parallel grating structures, and the center ramp is supported by the spring assemblies in the opposite side post members. In normal support attitude, the two side ramps are inclined at equal but opposite angles to the supporting ground and they are pivotally interconnected to the flat center ramp.

As a vehicle moves up onto the center ramp, the ramps are lowered flat to rest upon the surface of the ground. When the vehicle passes over the ramps, the ramps are automatically raised by the spring assemblies in delayed action to reform the original cattle guard shape. The main object of this invention is to provide a cattle guard that is portable and can be readily moved and reassembled at any desired fence line opening.

Another object of this invention is to provide a cattle guard which appears to approaching animals to be suspended over an open area thereby to create the illusion that there is nothing below the parallel spaced bars or rods creating the cattle guard.

It is another important object of this invention to provide a structure that will permit vehicles to pass thereover without damaging the cattle guard system.

It is still another object of this invention to provide a cattle guard that is aesthetically pleasing and does not require a trench or ditch to be dug at the fence line prior to installation of the cattle guard.

Yet another very important object of this invention is to provide a portable cattle guard that can be constructed from inexpensive, light-weight materials thereby to substantially reduce the costs and number of cattle guards that might be required.

A final object of this invention is to provide a cattle guard that can be used over a flat ground area.

These, along with other objects and advantages of this invention will become more readily apparent when construing the specification and drawings accompanying the specification wherein like numerals refer to like parts throughout.

BRIEF DESCRIPTION OF THE DRAWINGS

FIG. 3 is a top plan view of the device;

FIG. 4 is an elevational side view of a vertical post and spring assembly of the device with parts shown in cutaway; and FIG. 5 is a schematic illustration of the spring assembly of FIG. 4.

DETAILED DESCRIPTION OF THE INVENTION

Figure 1:
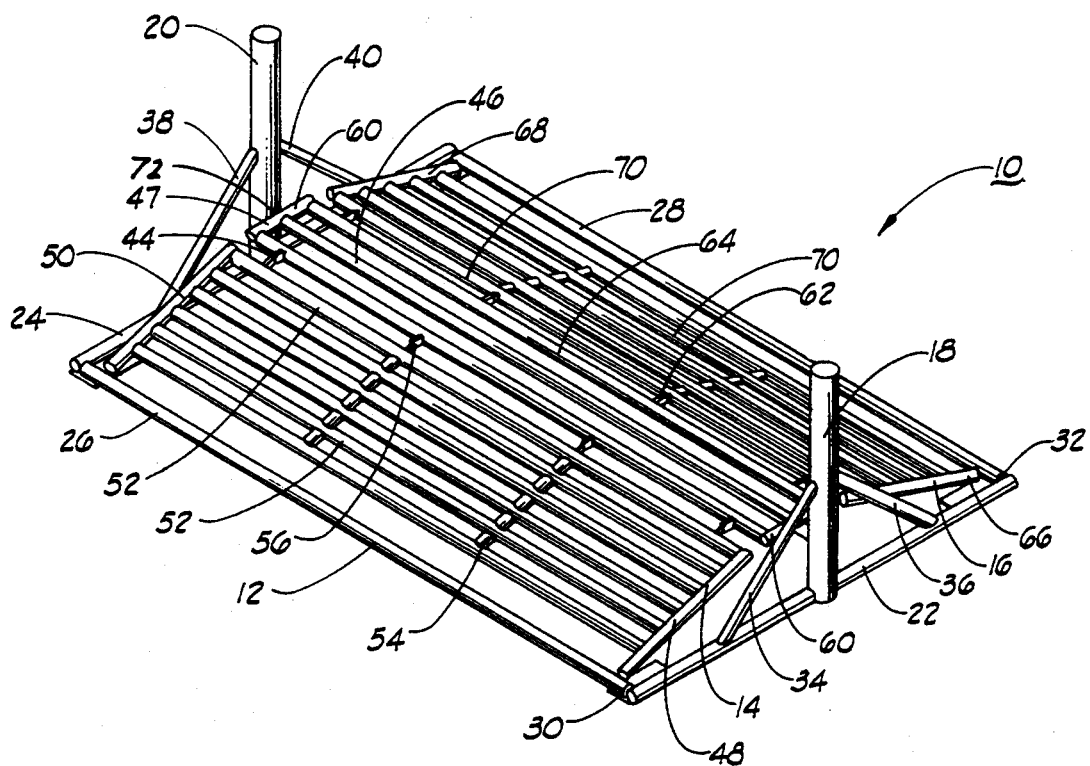
FIG. 1 is a perspective view from a forward quarter of a cattle guard constructed in accordance with the invention, shown fully assembled and in its operating position.
Figure 2:
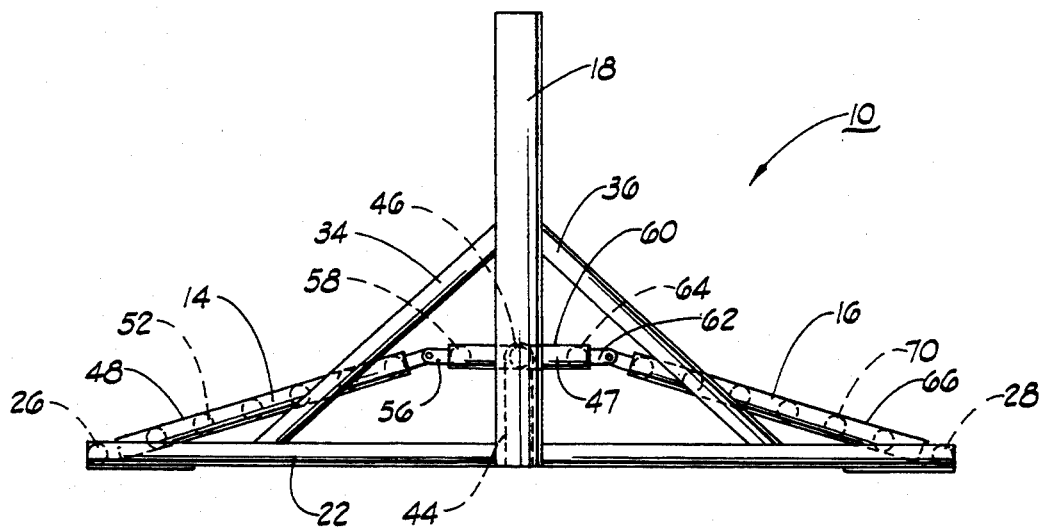
FIG. 2 is a side view in elevation of the device.

Referring now more specifically to FIGS. 1 and 2, the numeral 10 designates generally the portable cattle guard of this invention. The cattle guard device 10 comprises generally a rectangular shaped base or support number 12 with two inclined side ramps 14 and 16 movably connected to a flat center ramp 60 all of which are positioned within the confines of the base member 12.

The base member 12 includes a pair of opposite side bars 22 and 24, which are normally constructed from steel tubes or rods, joined to a pair of tubular end members 26 and 28, respectively. Each of the side bars 22, 24 has metal pegs or dowels 30 and 32 welded to its end sections so that they can be inserted into the open ends of the tubular frame end members 26 and 28. The end and side members are secured to each other by any conventional means such as welding or other conventional fasteners. Attached centrally to each of the side bars 22, 24 of the rectangular base member are two hollow tubular post members 18 and 20. Each of the hollow tubular post members contain an opposing guide slot 44 cut into an inside lower portion of the post members 18 and 20. The guide slots 44 provide for vertical movement (about thirteen inches) of the extended (middle) bar 46 of the center ramp 60. Contained within the hollow tubular post member 18, 20 is a coil spring and damping assembly, as will be further described below.

The tubular post 18 is secured vertically on side bar 22 and further secured by diagonal braces 34 and 36. Similarly, the opposite side tubular post 20 is braced by diagonal brace members 38 and 40. The guide ramp 14 consists of opposite side rails 48 and 50 which are secured to support a plurality of longitudinal bars 52 which are spaced about three inches apart for optimum cattle guarding efficiency. One or more spacing bars or stiffeners 54 may be suitably affixed between the successive longitudinal bars 52.

A plurality of pivotal hinges 56 are welded between the uppermost longitudinal bar 52 of ramp 14 and an outer bar 58 of center ramp 60, and similar pivotal hinges 62 are secured between the remaining outer bar 64 of center ramp 60 and the uppermost bar 70 of opposite side ramp 16. The side ramp 16 is constructed identically to the side ramp 14 as it includes side rails 66 and 68 supporting a plurality of spaced[longitudinal bars 70. Here again, spacer inserts or the like (not shown) may be secured between adjacent longitudinal bars 70 to maintain rigidity.

As shown in FIG. 3, the center ramp 60 is pivotally supported between vertical posts 18 and 20 by means of the central longitudinal bar 46 which is extended to expose opposite ends 72 and 74. That is, the ends 72 and 74 are extended through the opposite side bars 47 of center ramp 60 for insertion and support into the respective cut-out portions 44 at the lower, inner ends of upright posts 18 and 20. A spring assembly internal to the upright posts 18 and 20 allows selected vertical movement of center ramp 60 relative thereto. The structure and function of vertical posts 18 and 20 is identical in all respects and only differs in the mirror-image orientation.

Referring now to FIG. 4, the upright post 18, 20 (shown cut-away) receives the respective center ramp support end 72 of center ramp 60 into the respective cut-out 44 of vertical post 18. See also FIG. 1. The same would also be true for center ramp support end 74 as it is inserted in the lower cut-out 44 of vertical post 18. Within the respective vertical upright post 18, 20 there is disposed a coil spring 80 of elongate shape that is supported at the lower side by an internal collar 82 disposed approximately one foot from the lower end of the upright post 18, 20. A U-shaped steel strap 84 is disposed for insertion through support end 72, 74 of center ramp 60 to extend upward on each side of coil spring 80 and to include hook ends 86 and 88 for capture and retention of the upper end of coil spring 80. A dash-pot type of cylinder 90 is disposed down through the axial center of coil spring 80 for pivotal affixture at a pivot eye 92 secured on the top surface of the respective support ends 72, 74. The cylinder 90 also extends an actuator rod 94 upward such that a rod end 96 is secured at a selected height by means of a ]pivot pin 98 connected through the upright post 18, 20.

Thus, when a heavy weight is placed upon support end 72, 74, the center ramp 60 is rapidly depressed to ground level as strap hooks 86 and 88 compress the coil spring 80 downward, and cylinder 90 is drawn rapidly from the rod end 94. Upon removal of the downward force on support end 72, 74, coil spring 80 will return rapidly to its pre-stress condition; however, the cylinder 90 interjects a slight time delay in raising of the support end 72, 74 thereby to assure vehicle clearance when driving off of the device.

FIG. 5 shows schematically the effective components of the spring assembly of FIG. 4. The respective center ramp 60 support ends 72 and 74 traverse up and down along line 100 between ground level and the expanded center ramp level, and the center ramp 60 under, for example vehicle weight, compresses coil spring 80 by means of the steel strap 84 and upper hook ends 86, 88. The coil spring 80 is secured at the lower end by means of the support collar 82 within the vertical upright 18, 20. The dash pot effect for slowing spring return is accomplished by cylinder 90 being pivotally secured by pivot link 92 to the support end 72, 74 and a rod end 94 extends upward therefrom for secure affixture at pivot pin 98.

In operation, the portable cattle guard 10 may be delivered to and readily assembled at a fence opening or crossing where it is desired to exclude cattle movement. The device 10 may be moved by means of a light hauling vehicle to the site of usage and placed in operative position whereupon suitable anchors are applied to the rectangular frame 12 to maintain the device 10 in position. The device 10 is in the attitude shown in FIGS. 1 and 2 in normal cattle prohibition function as a center ramp 60 is maintained fully upward as support ends 72 and 74 are maintained uppermost in the respective guide slots 44 of vertical posts 18 and 20. The coil spring 80 maintains its uppermost position by assuming its unstressed position. The opposite side ramps 14 and 16 are hingedly connected to the center ramp 60 and rest in opposite angular disposition as the outer edges rest on the supporting surface. Thus, there is provided a slight incline of guard grating (14 and 16) on each side of a center ramp grating 60 that is disposed about one foot off of the supporting surface, and no trenching or other digging has been required along the guard line.

This proves to be a very effective cattle guard with few errant crossings. It is believed that this is due primarily to the fact that approaching cattle are only able to see the nearest ramp side and center ramp 60 without knowledge of what hazards may be on the immediate other side of the=center ramp 60. In addition, the combination of distances of the near side approach ramp 14 and center ramp 60 is such that an animal is much less likely to attempt to jump, and this is especially so when the animal does not know what structure or hazards are on the other side of center ramp 60.

When a vehicle approaches the device 10 it is merely necessary to drive up on the center ramp 60 so that support ends 72 and 74 depress downward to the support surface (see FIG. 4) and opposite side ramps 14 and 16 as hingedly affixed will also seek flat or ground level thereby to allow passage of the vehicle. As shown in FIG. 2, a slight space is allowed between the side ramps 14 and 16 and the respective longitudinal frame bars 26 and 28 to allow flattening. After the vehicle weight is removed from the center ramp 60, the coil spring 80 returns to its pre-stressed condition raising the support ends 72, 74 upward to their cattle guard operational level. The pressure cylinder 90, either air or hydraulic, provides a damping effect whereby the center ramp 60 cannot raise so quickly that it makes contact with or otherwise impedes vehicle progress as it leaves the cattle guard.

The coil springs 80 are selected in accordance with intended usage and present designs call for 0.437 inch diameter and 0.625 inch coil springs, depending on intended loads to be handled. The steel coil springs are on the order of approximately 40 inches in length as they are disposed in the vertical post 18, 20 so that they allow about a 13 inch traverse of center ramp support ends 72, 74.

The foregoing is considered as illustrative only since numerous modifications and changes readily occur to those skilled in the art. There is no intent to limit the invention to the exact construction, operation or materials shown and described. Thus, all suitable modifications and equivalents that might reasonably be employed would fall within the scope of the invention.

What is claimed is:

1. A portable cattle guard, comprising:
   a substantially rectangular base frame having opposite side members;
   first and second tubular vertical posts affixed centrally of respective base frame side members and each having a centrally facing vertical guide slot at a lower end;
   a center ramp having at least two longitudinal bars defining longitudinal edges and opposite sides and having axial support ends on each side, each of said support ends being supported in respective said first and second vertical post guide slots;
   first and second ramps pivotally affixed to said opposite longitudinal edges of said center ramp; and
   first and second spring assemblies of preselected compressibility disposed in respective first and second vertical posts to support the center ramp support ends at a predetermined height above said base frame as said first and second ramps rest adjacent the base frame;
   whereby weight on said center ramp exceeding the spring assembly compressibility depresses the center ramp and first and second ramps to the level of the base frame.

2. A portable cattle guard as set forth in claim 1 wherein each of said spring assemblies comprises:
   a coil spring normally supporting a respective center ramp support end approximately one foot above the base frame.

3. A portable cattle guard as set forth in claim 1 which further includes:
   a dash-pot cylinder and actuator rod connected between said respective center ramp support end and the upper end of said respective vertical post.

4. A portable cattle guard as set forth in claim 2 which further includes:
   a dash-pot cylinder and actuator rod connected between said respective center ramp support end and upward point in said respective vertical post.

5. A portable cattle guard as set forth in claim 1 wherein said center ramp comprises:
   first and second opposite side bars; and
   an odd number plurality of equi-spaced, longitudinal bars secured between said opposite side bars with a said centermost longitudinal bar extending through the respective side bars to form said center ramp axial support ends.

6. A portable cattle guard as set forth in claim 1 wherein said first and second ramps each comprise:
   first and second ramp side bars; and
   a plurality of equi-spaced, longitudinal bars secured between said respective ramp side bars.

7. A portable cattle guard as set forth in claim 5 wherein said first and second ramps each comprise:
   first and second ramp side bars; and
   a plurality of equi-spaced, longitudinal bars secured between said respective ramp side bars.

8. A portable cattle guard as set forth in claim 1 wherein each of said spring assemblies comprises:
   a coil spring having upper and lower ends with said lower end secured to said respective vertical post at a point proximate said center ramp support end and at normal, unstressed height; and
   steel strap means secured through said center ramp support end and extending upward for secure affixture to said coil spring upper end;
   whereby the center ramp support end under downward stress depresses with said steel strap means pulling the coil spring upper end downward thereby to compress the spring.

9. A portable cattle guard as set forth in claim 8 which further includes:
   a dash-pot cylinder and rod connected between the respective center ramp support ends and upward in said vertical post to delay rapidity of coil spring recovery to its unstressed attitude.

10. A portable cattle guard comprising:
    a center ramp consisting of at least two parallel longitudinal bars and two larger side ramps confined within a rectangular base member;
    vertical post members fixed to said rectangular base member;
    first and second spring biasing means operatively housed within said vertical post members;
    means for connecting said center ramp with said respective spring biasing means; and
    means for pivotally connecting said two larger side ramps with said center ramp so that said two cattle guard side ramps are normally oppositely inclined from said center ramp.

* * * * *